(12) United States Patent
Nguyen et al.

(10) Patent No.: US 7,908,600 B2
(45) Date of Patent: Mar. 15, 2011

(54) FAULT-TOLERANT PATCHING SYSTEM

(75) Inventors: PhiDien Ha Nguyen, San Jose, CA (US); Shamik Ganguly, Bangalore (IN); Debashis Saha, Sunnyvale, CA (US)

(73) Assignee: Oracle International Corporation, Redwood Shores, CA (US)

( * ) Notice: Subject to any disclaimer, the term of this patent is extended or adjusted under 35 U.S.C. 154(b) by 1030 days.

(21) Appl. No.: 11/173,838

(22) Filed: Jun. 30, 2005

(65) Prior Publication Data

US 2007/0006208 A1    Jan. 4, 2007

(51) Int. Cl.
*G06F 9/44* (2006.01)
*G06F 9/445* (2006.01)

(52) U.S. Cl. .................................. 717/168; 717/174

(58) Field of Classification Search .................. 717/101, 717/103, 110–113, 121–130, 168–178
See application file for complete search history.

(56) References Cited

U.S. PATENT DOCUMENTS

| | | | |
|---|---|---|---|
| 5,495,610 A | 2/1996 | Shing et al. | |
| 6,006,034 A | 12/1999 | Heath et al. | |
| 6,052,531 A | 4/2000 | Waldin et al. | |
| 6,349,407 B1 | 2/2002 | Towfiq | |
| 6,425,126 B1 | 7/2002 | Branson et al. | |
| 6,438,749 B1 * | 8/2002 | Chamberlain | 717/174 |
| 6,526,574 B1 * | 2/2003 | Jones | 717/168 |
| 6,535,894 B1 * | 3/2003 | Schmidt et al. | 707/204 |
| 6,990,660 B2 * | 1/2006 | Moshir et al. | 717/171 |
| 7,376,945 B1 * | 5/2008 | Kakumani et al. | 717/171 |
| 7,461,374 B1 * | 12/2008 | Balint et al. | 717/174 |
| 2003/0050932 A1 | 3/2003 | Pace et al. | |
| 2004/0015942 A1 * | 1/2004 | Branson et al. | 717/168 |

OTHER PUBLICATIONS

U.S. Appl. No. 10/073,669, filed Feb. 11, 2002, Office Action Mailing Date Dec. 28, 2005.
TDB-ACC-NO: NNRD412102, Disclosure Title: "System for Service Level Identification in Client/Server WWW/Java Environment", Research Disclosure, Aug. 1998, UK. 6 pages, retrieved form EAST V 2.0.1.4, Nov. 22, 2004.
Pugh, William; "Compressing Java Class Files", pp. 247-258, 1999 ACM database, Jan. 13, 2005.
"Updating a JAR File", 3 pages, retrieved from <URL http://java.sun.com/docs/books/tutorial/jar/basics/update.html>, retrieved Jan. 13, 2005.

(Continued)

*Primary Examiner* — Wei Y Zhen
*Assistant Examiner* — Ryan D Coyer
(74) *Attorney, Agent, or Firm* — Hickman Palermo Truong & Becker LLP

(57) ABSTRACT

Techniques that promote a fault-tolerant patching system are described. According to one such technique, a patching operation is performed in two phases. During the first phase, before the updates specified in the patching operation are actually applied, an attempt is made to backup files, or portions thereof, which are going to be updated by the patching operation. If a failure is detected during the first phase, then the patching operation aborts without proceeding to the second phase. During the second phase, an attempt is made to perform the updates that the patching operation specifies. If a failure is detected during the second phase, then all of the updated files, or portions thereof, are restored; those files or file portions are replaced with their corresponding backed-up copies, which were made during the first phase. The foregoing technique is extensible to a system in which prospectively affected files are distributed among nodes.

22 Claims, 3 Drawing Sheets

OTHER PUBLICATIONS

"Retrologic Systems RetroGuard Java Obfuscation", retrieved from google.com search , <URL http://www.retrologic.com/rg-docspatchadv.html>, Jan. 13, 2005.

Opatch Users Guide, 2003.

Michael Zampiceni, Oracle Universal Installer and Opatch User's Guide, Apr. 2009.

Sivakumar Seshadri, Oracle Universal Installer and OPatch User's Guide, Jun. 2005, 168 pages.

Alain Trottier, Sun Java 2 Enterprise edition (J2EE) Web component developer exam: exam 310-080, Que Publishing, Nov. 2002, 508 pages, 3 pages provided.

Sean Brydon, Carla Mott, Packaging Utility Classes or Library JAR Files in a Portable J2EE Application, Mar. 1, 2005, 6 pages.

Matt Albercht, "Grobo-Rezip: GroboCoverage Ant Tasks", GroboUtils Project, http://web.archive.org/web/20050209073452/http://groboutils.sourceforge.net/codecoverage/v2_antdoc_grobo-rezip.html; Feb. 9, 2005; 3 pages.

U.S. Appl. No. 11/174,069, filed Jun. 30, 2005, Final Office Action, Correspondence Mailing Date Mar. 4, 2010.

Weidenfeller, T., "Java—Make and execute .jar-file, forum post velocityreviews.com," Apr. 20, 2005, 3 pages.

\* cited by examiner

FAULT-TOLERANT PATCHING SYSTEM

FIELD OF THE INVENTION

The present invention relates to automated software-updating systems. The invention relates more specifically to a fault-tolerant patching system.

BACKGROUND OF THE INVENTION

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

After a computer program has been released for sale to the public, and consumers have purchased and installed the program on their computer, updates to the computer program may become available. Such updates may fix errors in the previously released program, or add enhanced features that were not present in the previously released program. Such updates are often supplied to consumers in the form of another customized program that applies changes to the binary code of the previously released program. Often, the changes applied to the binary code do not completely replace the binary code, but only alter portions thereof. The process of applying updates to portions of a previously released program, instead of replacing the program entirely, is called "patching," and the updates that are applied are called "patches."

Unfortunately, patching programs are sometimes imperfect. Patching programs do not always account for various circumstances that might prevent a patch from being applied completely. Under some circumstances, for various possible reasons, a patching program may fail after beginning to apply a patch, but before finishing. The patching program may be unable to resume. As a result, the target program to which the patch is being applied may be only partially updated. A target program that has been only partially updated might behave erratically, and might stop working altogether. This is clearly an undesirable outcome.

DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1:
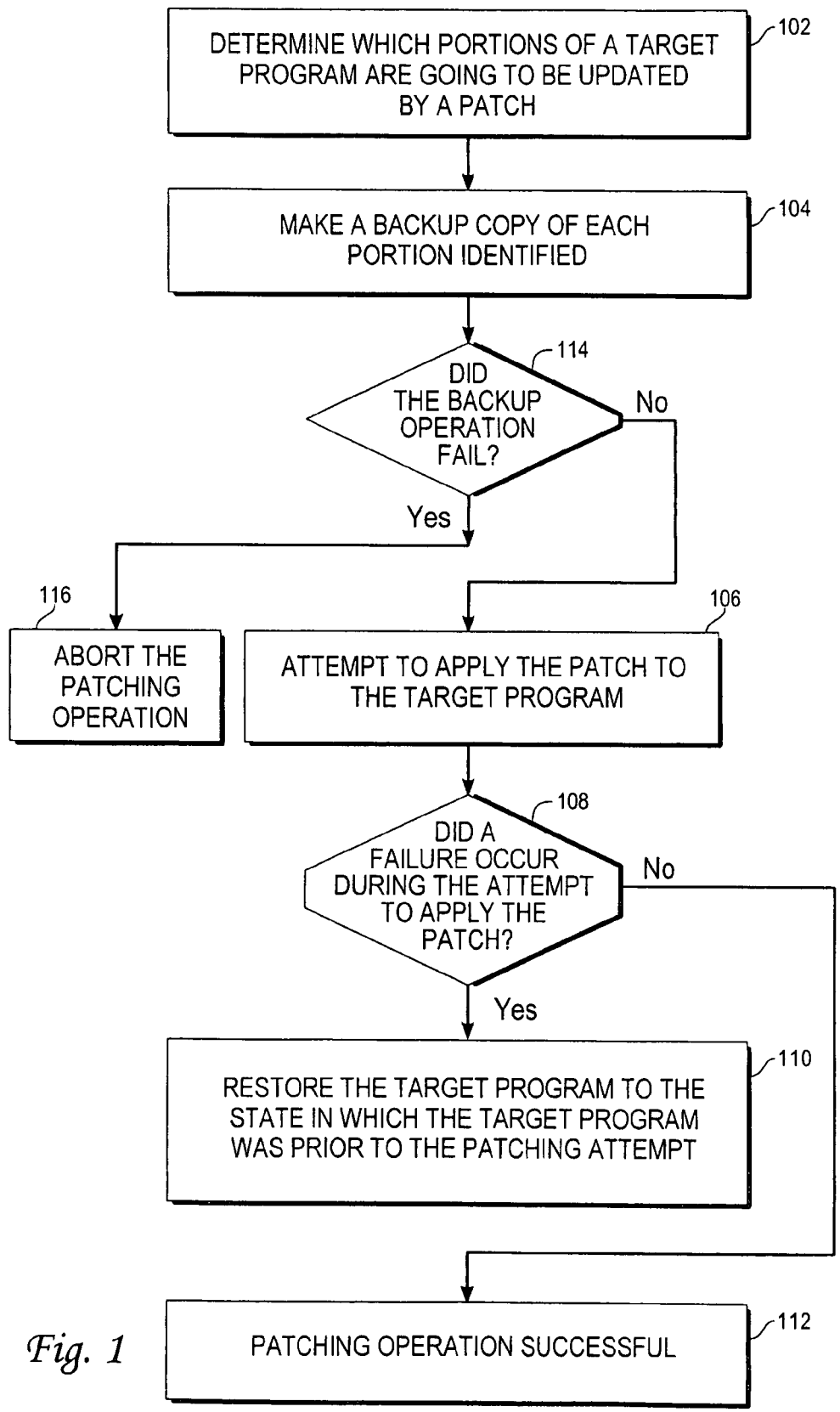
FIG. 1 is a flow diagram that illustrates a technique for performing a patching operation in an atomic manner, according to an embodiment of the invention.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Overview

A fault-tolerant patching system is described, along with techniques that may be used to implement such a fault-tolerant patching system. According to one such technique, a patching operation is performed in two phases. During the first phase, an attempt is made to backup files, or portions thereof, which are going to be updated by the patching operation. If a failure is detected during the first phase, then the patching operation aborts without proceeding to the second phase. During the second phase, an attempt is made to perform the updates that the patching operation specifies; an attempt is made to update the files, or portions thereof, which were previously backed-up. If a failure is detected during the second phase, then all of the updated files, or portions thereof, are restored; those files or file portions are replaced with their corresponding backed-up copies, which were made during the first phase. Under one variation of the technique, files that are based on the backed-up copies may be regenerated using the backed-up copies. This is advantageous when such files are too large to back up themselves. Such files may be generated after the backed-up copies are restored. For example, the above variation may be employed to perform a "make" operation after the restoration process described herein has been performed.

According to one technique, a patching operation that specifies updates to files that reside on separate nodes of a multi-node system is made atomic through a process that is similar to a two-phase commit protocol. During a first phase, each of the nodes on which a prospectively affected file resides is instructed to backup its resident files, or portions thereof, that will be affected by the patching operation. If any of the involved nodes is unable to backup these files or file portions, then all of the involved nodes are instructed to abort the patching operation before any of the files or file portions is modified by the patching operation. Alternatively, if all of the involved nodes are able to backup the prospectively affected files or file portions that reside on those nodes, then all of the involved nodes are instructed to proceed with the patching operation during a second phase. If a patching operation failure is detected while any of the involved nodes is performing the patching operation, then all of the involved nodes are instructed to reverse the effects of the patching operation by replacing the affected files or file portions with their corresponding copies, which were made during the first phase. In one embodiment of the invention, if patching fails on one of the nodes, then the patch tool attempts to recover every node back to the status quo. If the restoration process itself fails on a particular node, then the patch tool still can recover by copying relevant files from a "good" recovered node to the particular node.

As a result of the foregoing techniques, patching operations become atomic in nature; either all of the updates specified by a patching operation are applied successfully, or none of the updates specified by the patching operation are applied, in a permanent sense, at all. Thus, the problems that result from a patching operation being applied only partially are avoided.

Atomic Patching Operation

FIG. 1 is a flow diagram that illustrates a technique for performing a patching operation in an atomic manner, according to an embodiment of the invention. By performing the patching operation in an atomic manner, either the patch is entirely applied to the target files, or the target files are restored to the state in which they were prior to the patch's application. A patching program that executes on a computer may perform the illustrated technique in an automated way, for example.

In block 102, the portions of a target program that are going to be updated by a patch are determined. The target program may comprise one or more separate files. The portions may be determined with differing degrees of granularity. According to one embodiment of the invention, each file that is going to be affected by the patch is determined to be a separate portion. According to another embodiment of the invention, each file portion that is going to be affected by the patch is determined to be a separate portion. In such an embodiment, more than one portion may occur within a particular file.

Different techniques may be used to determine which portions of the target program are going to be updated by the patch. According to one embodiment of the invention, "static" metadata that identifies files and/or file portions is contained within the patch, and the patching program reads the metadata in order to determine the files and/or file portions that are going to be updated. According to one embodiment of the invention, such metadata is not necessarily contained within the patch, but, instead, is determined "dynamically" by the patching program by comparing the contents of the patch (e.g., updated binary code segments) with the contents of the target program. In one embodiment of the invention, the discovery logic that determines which files and/or file portions to patch is provided externally to the patching code. For example, through pre-script execution, the patch tool can interact with the patch target to determine which files to modify. The files to be modified may vary from system to system. In one embodiment of the invention, both "static" and "dynamic" information is used, as described above, to determine the portions that are going to be updated.

In block 104, for each portion identified in block 102, a backup copy of that portion is made and stored separately from the original. If the portion comprises a whole file, then a copy of the whole file is made. Alternatively, if the portion comprises only a part of a file, then, in one embodiment of the invention, a copy of that part of the file, without the remainder of the file, may be made. Control passes to block 114.

According to one embodiment of the invention, if a backup copy of any identified portion cannot be made, then the patching operation aborts, and none of the original files are updated as described below. This is shown in blocks 114 and 116. In block 114, it is determined whether the backup operation failed. If the backup operation failed, then control passes to block 116. In block 116, the patching operation aborts.

Alternatively, if the backup operation was successful, then control passes to block 106. In block 106, an attempt is made to apply the patch to the target program. For example, the patching program may attempt to update each of the original files or file portions that are affected by the patch. The attempt may complete without the occurrence of a failure, or, because of a failure during the attempt, the attempt might not complete entirely.

In block 108, it is determined whether a failure occurred during the attempt to apply the patch. For example, the patching program may make such a determination by examining the contents of the files that were supposed to be updated, and comparing those contents with the corresponding contents of the patch. If any of the contents do not match, then the patching program may conclude that the patching operation was not entirely successful. If a failure occurred during the attempt to apply the patch, then control passes to block 110. Otherwise, control passes to block 112. According to one embodiment of the invention, errors that happen during runtime also can be detected, and the detection of such runtime errors triggers the restoration operation described below with reference to block 110.

In block 110, the target program is restored to the state in which the target program was prior to the beginning of the patching attempt. This is accomplished by replacing the patch-affected portions with the backup copies of those portions that were made in block 104. In one embodiment of the invention, this replacement is performed automatically, such as by a patching program, for example. However, in an alternative embodiment of the invention, this replacement may be performed manually. The patching program may alert the user that the patching attempt was unsuccessful. After performing other actions as needed, the user may manually replace the updated portions with their corresponding backup copies. In one embodiment of the invention, files that have not been backed-up or copied, as described above, nevertheless may be regenerated based on the backup copies, if such files are based on the files that were copied.

Alternatively, in block 112, the patching operation was entirely successful, and no portions of the target program need to be restored. The backup copies may be deleted automatically.

The technique described above may be contrasted with other possible approaches in which a whole system, or a significant portion thereof, would be backed up. Under these other possible approaches, a large amount of information that was not necessarily related to or affected by a patching operation might be copied. As a result, these other possible approaches would waste storage resources. Additionally, in the event that the backed-up information needed to be restored, these other possible approaches could waste time and I/O resources by restoring lots of information that was not affected by the patching operation. Thus, in one embodiment of the invention, no file that was not updated by the patching operation is restored in the event that a failure occurs during the patching operation.

Under other approaches, which back up a whole system, the system may encounter a bad state. For example, under such an approach, preparatory to the application of a patch P1, a file "lib.a" might be backed up, after which "lib.a" might be updated with "foo.o." Subsequently, preparatory to the application of another patch P2, "lib.a" might be backed up, after which "lib.a" might be updated with "bar.o." Subsequently, patch P1 might be rolled back. During the rollback, the restoration of the copy of "lib.a" that was backed up preparatory to the application of patch P1 obliterates the "bar.o" update made during the application of patch P2.

In contrast, using a technique described herein, the following operations would take place instead. Preparatory to the application of patch P1, the old version of "foo.o" in "lib.a" would be backed up. When patch P1 was applied, "lib.a" would be updated with the new version of "foo.o." Then, preparatory to the application of patch P2, the old version of "bar.o" would be backed up. When patch P2 was applied, "lib.a" would be updated with the new version of "bar.o." In the event that patch P1 is subsequently rolled back, the problems with the other approaches are avoided, because the old version of "foo.o" is restored into "lib.a" instead of the entirety of "lib.a" being restored. The new version of "bar.o" remains in "lib.a" even after the rollback.

Distributed Patching Operations

In some circumstances, a patch may target files that are distributed among separate nodes of a multi-node system (e.g., an application server system with multi-node mid-tiers and an infrastructure such as a metadata repository). For example, a patch may target a first file that is stored on a first computer, and the same patch may target a second file that is stored on a second computer. Under such circumstances, it is beneficial to have some mechanism for ensuring that the patch will update none of the files unless the patch updates all of the files.

Figure 2:
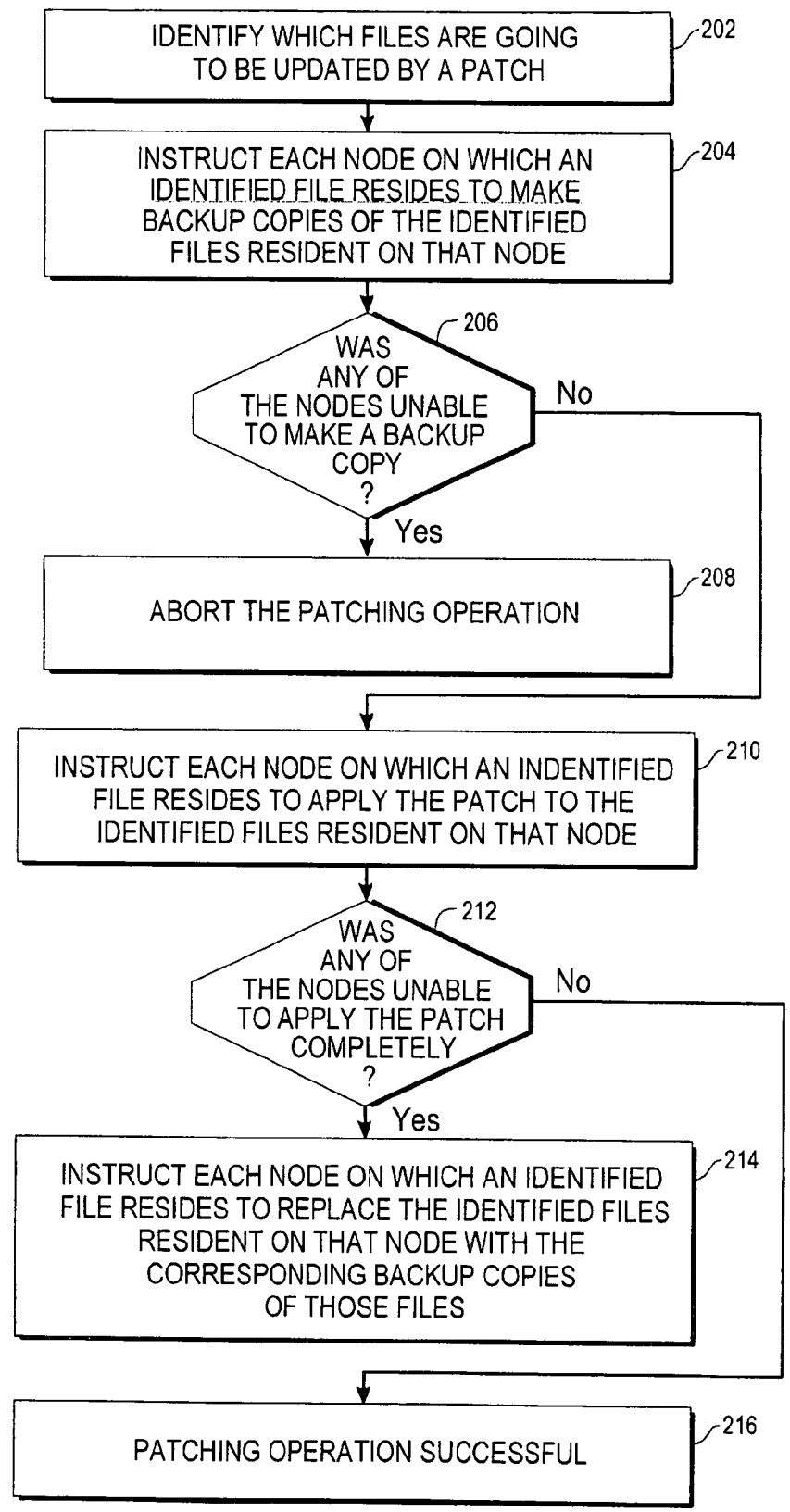
FIG. 2 is a flow diagram that illustrates a technique for performing, atomically, a patching operation that targets files that are distributed among multiple nodes, according to an embodiment of the invention.

FIG. 2 is a flow diagram that illustrates a technique for performing, atomically, a patching operation that targets files that are distributed among multiple nodes, according to an embodiment of the invention. A patching program that executes on a computer may perform the illustrated technique in an automated way, for example.

In block 202, the files and/or file portion that are going to be updated by a patch are identified. The files and/or file portions may reside on separate nodes of a multi-node system. The nodes on which the files and/or file portions reside also are identified.

In block 204, each node on which a file or file portion identified in block 202 resides is instructed to make a backup copy of each of the identified files and/or file portions that resides on that node. For example, a patching program may instruct both a first node and a second node to make backup copies of the previously identified file portions that reside on those nodes.

According to one embodiment of the invention, each node responds, to a patching program that instructed that node to make the backup copies, whether that node was able to make the backup copies successfully. Thus, from each node, the patching program may receive a response that indicates whether a failure occurred on that node while that node was attempting to make the backup copies.

In block 206, it is determined whether any of the nodes was unable to make the backup copies whose making was instructed in block 202. For example, the patching program may determine whether a "backup successful" response was received from each node on which one or more identified files and/or file portions reside. If at least one of the involved nodes did not return such a response in due time, or returned a response indicating a contrary outcome, then the patching program may conclude that a failure occurred on at least one of the involved nodes. If at least one of the involved nodes was unable to make the backup copies, then control passes to block 208. Otherwise, control passes to block 210.

In block 208, the patching operation is aborted. None of the files or file portions targeted by the patch is updated as described below. A user may be alerted that the patching operation failed because one or more files or file portions could not be backed up. The user may be given the identities of the files or file portions that could not be backup up. The user may be given the identities of one or more nodes on which those files or file portions reside.

Alternatively, in block 210, each node on which a file or file portion identified in block 202 resides is instructed to apply the patch to the patch-targeted files and/or file portions that reside on that node. For example, a patching program may instruct both a first node and a second node to apply the patch to the previously identified file portions that reside on those nodes.

According to one embodiment of the invention, each node responds, to a patching program that instructed that node to apply the patch, whether that node was able to apply the patch to all of that node's resident patch-targeted files and/or file portions successfully. Thus, from each node, the patching program may receive a response that indicates whether a failure occurred on that node while that node was attempting to apply the patch.

In block 212, it is determined whether any of the nodes was unable to apply the patch whose application was instructed in block 210. For example, the patching program may determine whether a "patch successful" response was received from each node on which one or more patch-targeted files and/or file portions reside. If at least one of the involved nodes did not return such a response in due time, or returned a response indicating a contrary outcome, then the patching program may conclude that a failure occurred on at least one of the involved nodes. If at least one of the involved nodes was unable to apply the patch completely, then control passes to block 214. Otherwise, control passes to block 216.

In block 214, each node on which a file or file portion identified in block 202 resides is instructed to reverse the effects of the patching operation by replacing all of that node's resident files and/or file portions that were affected by the patching operation with the corresponding backup copies made earlier. For example, a patching program may instruct both a first node and a second node to restore, from backup copies, the patch-affected file portions that reside on those nodes. In one embodiment of the invention, the restore operation can be controlled from one node, if the system on the other nodes is a copy of that one node. Such a configuration is possible, for example, in a Real Application Cluster. For example, the backup process can be performed on the controlling node, and during the restoration process, the backed-up files can be copied to the other nodes.

According to one embodiment of the invention, in response to such an instruction, each node replaces all of that node's resident files and/or file portions that were affected by the patching operation with the corresponding backup copies made earlier. The patching operation aborts. A user may be alerted that the patching operation failed because one or more files or file portions could not be updated. The user may be given the identities of the files or file portions that could not be updated. The user may be given the identities of one or more nodes on which those files or file portions reside.

Alternatively, in block 216, the patching operation was entirely successful, and no patch-targeted files or file portions need to be restored. The backup copies may be deleted automatically.

Hardware Overview

Figure 3:
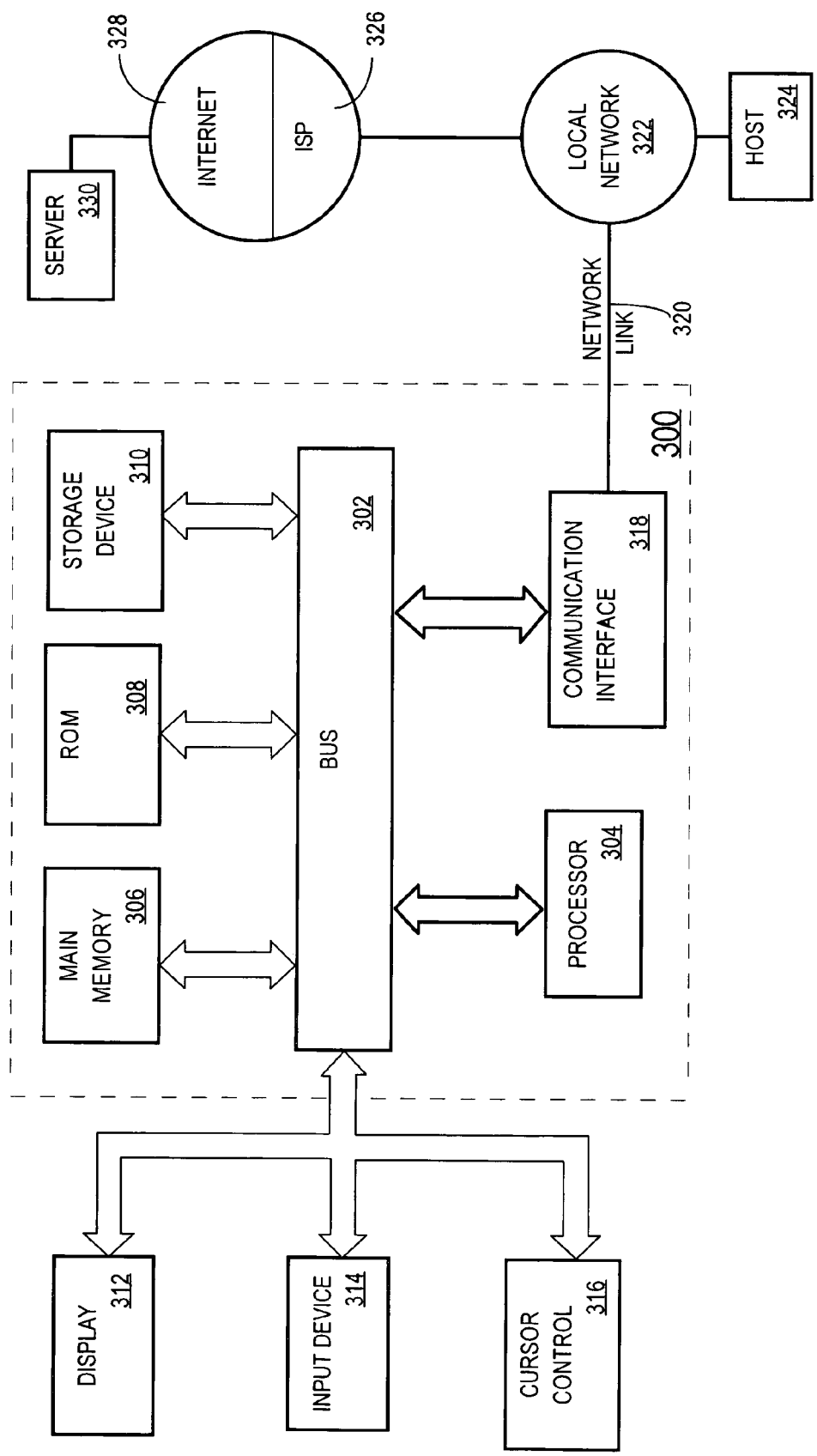
FIG. 3 is a block diagram that illustrates a computer system upon which an embodiment of the invention may be implemented.

FIG. 3 is a block diagram that illustrates a computer system 300 upon which an embodiment of the invention may be implemented. Computer system 300 includes a bus 302 or other communication mechanism for communicating information, and a processor 304 coupled with bus 302 for processing information. Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

The invention is related to the use of computer system 300 for implementing the techniques described herein. According to one embodiment of the invention, those techniques are performed by computer system 300 in response to processor 304 executing one or more sequences of one or more instructions contained in main memory 306. Such instructions may be read into main memory 306 from another machine-readable medium, such as storage device 310. Execution of the sequences of instructions contained in main memory 306 causes processor 304 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing instructions to processor 304 for execution. Such a medium may take many forms, including but not limited to, non-volatile media, volatile media, and transmission media. Non-volatile media includes, for example, optical or magnetic disks, such as storage device 310. Volatile media includes dynamic memory, such as main memory 306. Transmission media includes coaxial cables, copper wire and fiber optics, including the wires that comprise bus 302. Transmission media can also take the form of acoustic or light waves, such as those generated during radio-wave and infrared data communications.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 304 for execution. For example, the instructions may initially be carried on a magnetic disk of a remote computer. The remote computer can load the instructions into its dynamic memory and send the instructions over a telephone line using a modem. A modem local to computer system 300 can receive the data on the telephone line and use an infrared transmitter to convert the data to an infrared signal. An infrared detector can receive the data carried in the infrared signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are exemplary forms of carrier waves transporting the information.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution. In this manner, computer system 300 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A computer-implemented method of preparing to patch files, comprising:
   interacting with two or more computers to identify two or more file portions of a target program residing on the two or more computers that are targeted for update by a patch, wherein the interacting comprises comparing contents of the patch with contents of the target program residing on the two or more computers;
   instructing the two or more computers to make copies of the identified two or more file portions that are targeted for update by the patch, wherein at least two of the two or more file portions reside on different computers of the two or more computers;
   determining whether at least one computer of the two or more computers was unable to make a copy of a file portion that resides on that computer, wherein the two or more computers include a first computer and a second computer that is different than the first computer;

determining that the first computer was unable to make a copy of a file portion that resides on the first computer;

determining that the second computer was able to make a copy of a file portion that resides on the second computer;

in response to determining that the first computer was unable to make a copy of a file portion that resides on the first computer, then:
 (a) instructing the first computer to abort a patching operation before any of the two or more file portions has been updated by the patch, and
 (b) instructing the second computer to abort the patching operation;

wherein the method is performed by one or more computing devices.

2. The method of claim 1, further comprising:

determining whether a failure occurred during the patching operation on at least one computer of the two or more computers; and in response to determining that a failure occurred during the patching operation on at least one computer of the two or more computers, instructing the two or more computers to reverse the patching operation by replacing, with corresponding copies of file portions that were made before the patching operation was performed, all file portions that were modified by the patching operation.

3. A volatile or non-volatile computer-readable storage medium storing instructions which, when executed by one or more processors, causes:

interacting with two or more computers to identify two or more file portions of a target program residing on the two or more computers that are targeted for update by a patch, wherein the interacting comprises comparing contents of the patch with contents of the target program residing on the two or more computers;

instructing the two or more computers to make copies of the identified two or more file portions that are targeted for update by the patch, wherein at least two of the two or more file portions reside on different computers of the two or more computers;

determining whether at least one computer of the two or more computers was unable to make a copy of a file portion that resides on that computer, wherein the two or more computers include a first computer and a second computer that is different than the first computer;

determining that the first computer was unable to make a copy of a file portion that resides on the first computer;

determining that the second computer was able to make a copy of a file portion that resides on the second computer;

in response to determining that the first computer was unable to make a copy of a file portion that resides on
 (a) instructing the first computer to abort a patching operation before any of the two or more file portions has been updated by the patch, and
 (b) instructing the second computer to abort the patching operation.

4. The volatile or non-volatile computer-readable storage medium of claim 3, wherein the steps further comprise instructions, when executed by the one or more processors, further cause:

determining whether a failure occurred during the patching operation on at least one computer of the two or more computers; and in response to determining that a failure occurred during the patching operation on at least one computer of the two or more computers, instructing the two or more computers—to reverse the patching operation by replacing, with corresponding copies of file portions that were made before the patching operation was performed, all file portions that were modified by the patching operation.

5. The method of claim 1, wherein a first set of file portions, comprising all file portions that are targeted for update by the patch at one computer of the two or more computers, is different than a second set of file portions, comprising all file portions that are targeted for update by the patch at another computer of the two or more computers.

6. The method of claim 1, wherein each file that is targeted for update by the patch is determined to be a separate file portion.

7. The method of claim 1, wherein logic that determines the file portions that are targeted for update by the patch is provided separately from the patch.

8. The volatile or non-volatile computer-readable storage medium of claim 3, wherein a first set of file portions, comprising all file portions that are targeted for update by the patch at one computer of the two or more computers, is different than a second set of file portions, comprising all file portions that are targeted for update by the patch at another computer of the two or more computers.

9. The volatile or non-volatile computer-readable storage medium of claim 3, wherein each file that is targeted for update by the patch is determined to be a separate file portion.

10. The volatile or non-volatile computer-readable storage medium of claim 3, wherein logic that determines the file portions that are targeted for update by the patch is provided separately from the patch.

11. The method of claim 1, wherein the method is performed by a patching tool executing at one of the two or more computers or a third computer that is not one of the two or more computers.

12. The volatile or non-volatile computer-readable storage medium of of claim 3, wherein the instructions implement a patching tool that executes at one of the two or more computers or a third computer that is not one of the two or more computers.

13. A method for performing a distributed patching operation, the method comprising, as part of the distributed patching operation:

instructing a plurality of nodes of a multi-node system to patch a plurality of files that reside on the plurality of nodes;

wherein a first file of the plurality of files resides on a first node of the plurality of nodes;

wherein a second file of the plurality of files resides on a second node, of the plurality of nodes, that is different than the first node;

determining whether a failure of the distributed patching operation occurred at two or more of the plurality of nodes;

determining that a failure of the distributed patching operation occurred at the first node;

determining that a failure of the distributed patching operation did not occur at the second node;

in response to determining that a failure of the distributed patching operation occurred at the first node:
 (a) instructing the first node to abort the distributed patching operation, and
 (b) instructing the second node to abort the distributed patching operation;

wherein the method is performed by two or more computing devices.

14. The method of claim 13, wherein instructing the plurality of nodes comprises instructing the first node to make a backup copy of the first file and instructing the second node to make a backup copy of the second file.

15. The method of claim 14, wherein:
determining whether a failure of the distributed patching operation occurred at two or more of the plurality of nodes comprises determining whether the first node was able to make a backup copy of the first file and determining whether the second node was able to make a backup copy of the second file; and
determining that a failure of the distributed patching operation occurred at the first node comprises determining that the first node was unable to make a backup copy of the first file.

16. The method of claim 13, wherein instructing the plurality of nodes comprises instructing the first node to applying a patch of the first file and instructing the second node to apply a patch of the second file.

17. The method of claim 16, wherein:
determining whether a failure of the distributed patching operation occurred at two or more of the plurality of nodes comprises determining whether the first node was able to apply the patch of the first file and determining whether the second node was able to apply the patch of the second file; and
determining that a failure of the distributed patching operation occurred at the first node comprises determining that the first node was unable to apply the patch of the first file.

18. A volatile or non-volatile computer-readable storage medium for performing a distributed patching operation, the medium storing instructions which, when executed by one or more processors, cause, as part of the distributed patching operation:
instructing a plurality of nodes of a multi-node system to patch a plurality of files that reside on the plurality of nodes;
wherein a first file of the plurality of files resides on a first node of the plurality of nodes;
wherein a second file of the plurality of files resides on a second node, of the plurality of nodes, that is different than the first node;
determining whether a failure of the distributed patching operation occurred at any of the plurality of nodes;
determining that a failure of the distributed patching operation occurred at the first node;
determining that a failure of the distributed patching operation did not occur at the second node;
in response to determining that a failure of the distributed patching operation occurred at the first node:
 (a) instructing the first node to abort the distributed patching operation, and
 (b) instructing the second node to abort the distributed patching operation.

19. The volatile or non-volatile computer-readable storage medium of claim 18, wherein instructing the plurality of nodes comprises instructing the first node to make a backup copy of the first file and instructing the second node to make a backup copy of the second file.

20. The volatile or non-volatile computer-readable storage medium of claim 19, wherein:
determining whether a failure of the distributed patching operation occurred at two or more of the plurality of nodes comprises determining whether the first node was able to make a backup copy of the first file and determining whether the second node was able to make a backup copy of the second file; and
determining that a failure of the distributed patching operation occurred at the first node comprises determining that the first node was unable to make a backup copy of the first file.

21. The volatile or non-volatile computer-readable storage medium of claim 18, wherein instructing the plurality of nodes comprises instructing the first node to applying a patch of the first file and instructing the second node to apply a patch of the second file.

22. The volatile or non-volatile computer-readable storage medium of claim 21, wherein:
determining whether a failure of the distributed patching operation occurred at two or more of the plurality of nodes comprises determining whether the first node was able to apply the patch of the first file and determining whether the second node was able to apply the patch of the second file; and
determining that a failure of the distributed patching operation occurred at the first node comprises determining that the first node was unable to apply the patch of the first file.

* * * * *

UNITED STATES PATENT AND TRADEMARK OFFICE
CERTIFICATE OF CORRECTION

| | | |
|---|---|---|
| PATENT NO. | : 7,908,600 B2 | Page 1 of 1 |
| APPLICATION NO. | : 11/173838 | |
| DATED | : March 15, 2011 | |
| INVENTOR(S) | : Nguyen et al. | |

It is certified that error appears in the above-identified patent and that said Letters Patent is hereby corrected as shown below:

On Title page, in column 2, under "Other Publications", line 5, delete "form" and insert -- from --, therefor.

In column 9, line 55, in Claim 3, after "on" insert -- the computer, then: --.

In column 9, line 62, in Claim 4, after "the" delete "steps further comprise".

In column 10, line 40, in Claim 12, after "of" delete "of". (Second Occurrence)

Signed and Sealed this
Fourth Day of October, 2011

David J. Kappos
*Director of the United States Patent and Trademark Office*